(12) United States Patent
Fujino et al.

(10) Patent No.: US 7,583,018 B2
(45) Date of Patent: Sep. 1, 2009

(54) LIGHT SOURCE APPARATUS AND DISPLAY APPARATUS

(75) Inventors: Toyomi Fujino, Kanagawa (JP);
Kazuyasu Onouchi, Kanagawa (JP);
Hisataka Izawa, Kanagawa (JP);
Masayuki Ohta, Tokyo (JP)

(73) Assignee: Sony Corporation, Tokyo (JP)

( * ) Notice: Subject to any disclaimer, the term of this patent is extended or adjusted under 35 U.S.C. 154(b) by 301 days.

(21) Appl. No.: 11/427,557

(22) Filed: Jun. 29, 2006

(65) Prior Publication Data

US 2007/0008722 A1    Jan. 11, 2007

(30) Foreign Application Priority Data

Jul. 1, 2005    (JP) .......................... P2005-194220

(51) Int. Cl.
*H01J 1/62* (2006.01)
(52) U.S. Cl. .................. 313/498; 362/231; 362/235; 362/296
(58) Field of Classification Search .................. 362/231, 362/235, 296; 313/498
See application file for complete search history.

(56) References Cited

U.S. PATENT DOCUMENTS 6,200,002 B1 *    3/2001    Marshall et al. ............. 362/231

FOREIGN PATENT DOCUMENTS

| JP | 7-3154 | 1/1995 |
| JP | 11-3051 | 1/1999 |
| JP | 11-162233 | 6/1999 |
| JP | 2004-140327 | 5/2004 |

* cited by examiner

*Primary Examiner*—Vip Patel
(74) *Attorney, Agent, or Firm*—K&L Gates, LLP

(57) ABSTRACT

A light source apparatus and display apparatus are provided. The light source apparatus includes light-emitting devices for emitting lights of at least more than two kinds of colors and one light-emitting device group composed of the light-emitting devices located close to each other, wherein each of the light-emitting device group includes a plurality of light-emitting devices for emitting lights of at least more than one kind of color of more than two kinds of colors, a plurality of light-emitting devices being disposed such that central positions of light-emitting devices for emitting lights of respective colors are substantially matched with each other.

17 Claims, 10 Drawing Sheets

1

1

2

LIGHT SOURCE APPARATUS AND DISPLAY APPARATUS

CROSS REFERENCES TO RELATED APPLICATIONS

The present application claims priority to Japanese Patent Application JP 2005-194220 filed in the Japanese Patent Office on Jul. 1, 2005, the entire contents of which is being incorporated herein by reference.

BACKGROUND

The present invention generally relates to a light source apparatus including light-emitting devices such as light-emitting diodes as a light source thereof, and particularly to a light source apparatus suitable for the application to an illumination light source capable of obtaining a white surface light source by equally diffusing and energizing light-emitting diodes of three colors of R (red), G (green) and B (blue). Also, the present invention relates to a display apparatus including a light source apparatus for illuminating a display portion from the back.

As a use of a light-emitting diode (LED), there is known a white LED capable of emitting white light by combining a plurality of white light-emitting diodes (white LEDs) with light-emitting diodes of three colors of R (red), G (green) and B (blue) or light-emitting diodes of other colors.

As light-emitting diodes become more powerful in recent years, a use of this white LED light source is being widely spread.

In particular, it has been considered that the white LED light source may be applied to backlights of illumination light sources, projector light sources and large-sized liquid-crystal displays. In these uses, because light-emitting diodes are featured in that they are free from mercury, small in environmental load, excellent in color reproducibility, excellent in responsiveness, have brightness variability and that they are long in service life, the white LED light source may be expected as a white light source which can replace related-art fluorescent tubes (hot cathode tube and cold cathode tube).

When the white LED light source is applied to the backlights of the above-mentioned illumination light source, projector light source and large-sized liquid-crystal display, in order to achieve required brightness to provide a surface light source, it is necessary to use a large number of light-emitting diodes which are point sources of light at present. Also, it is requested that unevenness in brightness and unevenness in chromaticity of the whole of the surface light source should be controlled so as to fall within predetermined ranges.

Two types of backlights, that is, an edge-light type backlight and a direct type backlight are known as typical backlight structures using light-emitting diodes.

The edge-light type backlight include light-emitting diodes to emit light onto an end face of a light guide plate provided on the lower surface of a diffuser from the direction perpendicular to the illumination direction thereby to provide a surface light source.

The direct type backlight includes light-emitting diodes located just under the diffuser in an XY matrix fashion (that is, in a two-dimensional fashion) to emit light in the direction vertical to the diffuser to thereby provide a surface light source.

According to the edge-light type backlight, light guided to the light guide plate from the light source located in the lateral direction of the screen is changed in direction toward the front of the screen by a diffusing sheet or a reflective sheet.

However, luminous efficiency is unavoidably lowered because a quantity of light is considerably decreased by a loss of light during the direction of traveling light is changed and hence brightness tends to be lowered at the position distant from the light source.

For this reason, the edge-light type backlight is employed by relatively small-sized backlights.

On the other hand, the direct type backlight is suitable for use with relatively large-sized backlights.

However, since a length of a light path ranging from the light-emitting diodes to the diffuser plate is reduced as compared with the edge-light type backlight under the condition that the thickness of the backlight is limited, it is comparatively difficult to uniformly disperse lights from the respective light-emitting diodes into the plane.

Then, while the direct type backlight has an advantage in which brightness can be increased easily, it has drawbacks in which unevenness in brightness and unevenness in chromaticity tend to occur.

On the other hand, in the direct type backlight, there are known methods for uniformly dispersing lights from the respective light-emitting diodes into the plane within a range of a limited thickness of the backlight.

For example, known methods are:

(1) To increase a diffusing rate of the diffuser;

(2) To dispose a large number of small-sized light-emitting diodes; and (3) To dispose optical members capable of diffusing lights emitted from respective light-emitting diode light sources in the lateral direction on respective light-emitting diodes.

However, when the above-mentioned method (1) for increasing the diffusing rate of the diffuser is used, since transmittance of the diffuser is lowered, a utilization factor of light is lowered and as a result it is unavoidable that electric power required to obtain predetermined brightness is increased. Also, according to this method (1), there are limits in effects for improving unevenness in brightness and unevenness in chromaticity.

For this reason, it is desirable to use the method (2) to dispose a large number of small-sized light-emitting diodes and the method (3) to dispose optical members capable of diffusing lights emitted from respective light-emitting diode light sources in the lateral direction on respective light-emitting diodes.

According to any of the methods (1) to (3), when a white light source is provided by a combination of light-emitting diodes of three colors of R, G and B or light-emitting diodes of other colors, arrangements of light-emitting diodes of respective colors and optical radiation characteristics should be considered in such a manner that respective color may become white surface light sources without unevenness in brightness and unevenness in chromaticity within a predetermined visual field angle on the whole surface of the panel of the backlight.

An arrangement using a lens or a substantially conical reflective surface is known as an arrangement using the above-mentioned method (3) to dispose optical members capable of diffusing lights emitted from respective light-emitting diode light sources in the lateral direction on respective light-emitting diodes. See, Japanese Published Utility Model Application No. 7-3154 and Japanese Published Utility Model Application No. 2004-140324.

In particular, according to the arrangement using the substantially conical reflective surface, since light emitted from the light-emitting diode is changed to substantially the lateral direction to extend the light path length and the light-emitting direction is changed again to the backlight panel direction by suitable devices such as the diffuser and a brightness increasing film, unevenness in brightness and unevenness in chromaticity between the respective light-emitting diodes can be dispersed satisfactorily.

Further, it is possible to construct a light-emitting diode package (LED package) by the light-emitting diodes and the substantially conical reflective surface.

Then, there is proposed an LED package in which the package having the above-mentioned arrangement is applied to the white light source using the light-emitting diodes of three colors of R, G and B. See, Japanese Published Patent Application No. 2004-140327.

When the backlight is configured by the white light source composed of the light-emitting diodes of three colors of R, G and B, the light-emitting diodes of respective emitted colors should be energized in order to obtain a white color of desired color temperature. To this end, the light-emitting diode of each color should be energized with brightness matched with a predetermined brightness ratio determined by a light-emission wavelength.

However, since luminous efficiency of the light-emitting diode differs in emitted light of each color, the light-emitting diodes of other light-emission colors should be energized at a decreased output in harmony with a light-emitting diode of light-emission color of which rated light-emission brightness ratio relative to required brightness is lowest.

As a result, since light of color with satisfactory luminous efficiency is unavoidably emitted at light-emission brightness lower than the rated light-emission brightness, power consumption efficiency is deteriorated and the number of light-emitting diodes required to obtain a desired white brightness value is increased. Then, problems of increase of a cost and the like arise inevitably.

Accordingly, in order to realize a desired chromaticity of white while the light-emitting diodes of respective colors are being energized efficiently, there is proposed an arrangement in which chip areas of the light-emitting diodes for emitting respective lights of colors of R, G and B are made different. See, Japanese Published Patent Application No. 11-162233.

Further, there is proposed an arrangement in which chromaticity distributions of several sets of groups may be equalized by changing the arrangement of the light-emitting diodes of respective colors so that asymmetry of chromaticity can be improved. See, Japanese Published Patent Application No. 11-3051.

For example, if the light-emitting diode chips of three colors of R, G and B are disposed in a delta fashion as shown in FIG. 1A or if they are disposed in an in-line fashion as shown in FIG. 1B, even when a large number of small-sized light-emitting diodes are disposed, three colors can easily be mixed to provide white light insofar as the respective chips are disposed closely. Therefore, the above-mentioned problem is difficult to arise.

On the other hand, as shown in FIGS. 2A, 2B and 2C, if a single substantially conical reflective surface is disposed relative to one set of the light-emitting diodes of three colors of R, G and B, then predetermined angular extents of the lateral direction become the reflection areas of respective colors of R, G and B relative to the central axis of the cone so that unevenness in brightness and unevenness in chromaticity of reflected light tends to be emphasized too much.

Specifically, as shown in FIG. 2A, if a substantially conical member 51 of which surface is formed as a reflective surface is disposed on the central position of the R, G and B chips disposed like a delta, then as FIG. 2B shows a cross-sectional view seen from the direction shown by an arrow A in FIG. 2A, light emitted from the light-emitting diode of each chip is reflected on the reflective surface of the substantially conical member 51 and thereby traveled toward the lateral direction so as to move away from the central position.

Consequently, as FIG. 2C shows a plan view, the circumference of the R, G and B chips is divided into three areas of an R main light-emitting area, a G main light-emitting area and a B main light-emitting area. In these R, G and B main light-emitting areas, intensity of each emitted light is increased in particular so that it becomes difficult to sufficiently mix those emitted lights to provide white light even when they are passed through the diffuser.

Further, if the optical member having the substantially conical reflective surface, the arrangement (arrangement in which the chip areas are made different) described in the Cited Patent Reference 3) and the arrangement (arrangement in which the arrangements of emitted colors are changed at every set) described in the Cited Patent Reference 4 are simply combined, then unevenness in chromaticity tends to occur.

SUMMARY

In order to solve the above-mentioned problems, the present invention in an embodiment relates to a light source apparatus in which unevenness in chromaticity can be reduced and a display apparatus including this light source apparatus.

According to an embodiment, there is provided a light source apparatus which includes light-emitting devices for emitting lights of at least more than two kinds of colors and one light-emitting device group composed of the light-emitting devices located close to each other. In this light source apparatus, each of the light-emitting device group includes a plurality of light-emitting devices for emitting lights of at least more than one kind of color of the more than two kinds of colors, a plurality of light-emitting devices being disposed such that central positions of light-emitting devices for emitting lights of respective colors are substantially matched with each other.

Also, a display apparatus according to an embodiment includes a display portion and a light source apparatus for illuminating this display portion from the back side.

According to the arrangement of the above-mentioned light source apparatus, since each light-emitting device group includes a plurality of light-emitting devices for emitting lights of colors of more than at least one kind of color in lights of more than two kinds of colors and the light-emitting diodes are disposed in such a manner that central positions of the light-emitting devices for emitting lights of respective colors are substantially matched with each other, the light-emitting devices for emitting lights of respective colors are substantially symmetrical to each other.

In consequence, in each light-emitting device group, lights of respective colors can be mixed easily and it becomes possible to decrease unevenness in chromaticity. Also, it becomes possible to decrease unevenness in brightness.

Further, according to the arrangement of the display apparatus, since the light source apparatus for illuminating the display portion from the back side is the arrangement of the light source apparatus according to the embodiment of the present invention, unevenness in chromaticity and unevenness in brightness of the light source apparatus can be decreased. As a result, distributions of chromaticity and brightness of an image displayed on the display portion become excellent distributions.

According to the above-mentioned light source apparatus, since it becomes possible to decrease unevenness in chromaticity and unevenness in brightness, it becomes possible to realize an excellent white light source by mixing lights emitted from the light-emitting devices for emitting lights of more than two kinds of colors.

Also, according to the display apparatus, since the distributions of the chromaticity and the brightness of the image displayed on the display portion become the excellent distributions, it is possible to display an image to be displayed with excellent image quality.

Additional features and advantages are described herein, and will be apparent from, the following Detailed Description and the figures.

DETAILED DESCRIPTION

The present invention will now be described in detail with reference to the drawings according to various embodiments.

Figure 3:
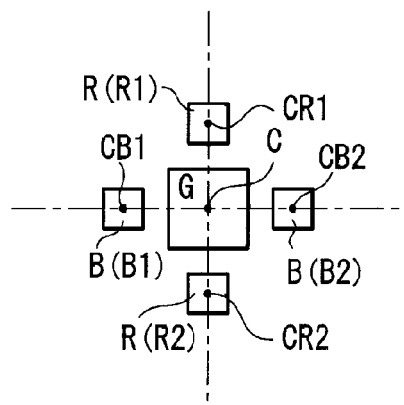
FIG. 3 is a plan view showing a main portion of a light source apparatus according to a first embodiment of the present invention.

FIG. 3 is a plan view showing a main portion of a light source apparatus according to a first embodiment.

As shown in FIG. 3, the light source apparatus includes light-emitting diodes for emitting lights of three colors, that is, a red light-emitting diode R, a green light-emitting diode G and a blue light-emitting diode B by which one set of a light-emitting diode unit 1 is constructed.

Further, in order to achieve desired chromaticity of white while driving the light-emitting diodes of respective colors with high luminous efficiency, a chip area of a light-emitting diode for emitting light of color with insufficient light-emission brightness, that is, the green light-emitting diode G is selected to be larger than those of the light-emitting diodes R and B for emitting lights of other colors, that is, red and blue.

According to the embodiment, in particular, in the light-emitting diode unit 1, the central positions of the light-emitting diodes for emitting lights of red, green and blue R, G and B are matched with each other and the light-emitting diodes for emitting lights of red, green and blue R, G and B are disposed symmetrical with respect to the center.

Two red light-emitting diodes R1 and R2 have central positions CR1 and CR2 and the central position of the whole of the two red light-emitting diodes R1 and R2 becomes the position shown by reference character C in FIG. 3. Also, the two red light-emitting diodes R1 and R2 are disposed symmetrical with respect to the center C.

Two blue light-emitting diodes B1 and B2 have central positions CB1 and CB2 and the central position of the whole of the two blue light-emitting diodes B 1 and B2 becomes the position shown by reference character C in FIG. 3. Also, the two red light-emitting diodes B1 and B2 are disposed symmetrically with respect to the center C.

One green light-emitting diode G has the central position matched with the position C shown in FIG. 3 and it is made symmetrical with respect to the center C.

More specifically, the central positions of the light-emitting diodes for emitting lights of colors R, G and B are made coincident with the point C in FIG. 3 and the light-emitting diodes for emitting lights of colors R, G and B are disposed symmetrically with respect to the center C.

Consequently, optical symmetry can be maintained within the light-emitting diode unit 1 and hence it becomes possible to decrease unevenness in chromaticity.

In the light-emitting diodes shown in FIG. 3, sizes and arrangements of the light-emitting diodes R, G and B for emitting lights of red, green and blue may be selected in such a manner that the green light-emitting diode G, for example, may be formed as a square of which one side is 1 mm, the red light-emitting diode R and the blue light-emitting diode B may be formed as squares of which one sides are 0.35 mm. Further, the distances from the central position C to the central positions CR1, CR2, CB1 and CB2 of the light-emitting diodes R1, R2, B 1 and B2 disposed around the central position C may be selected to be approximately 0.35 mm, respectively.

The sizes and arrangement are not limited to those ones but it is desirable that the distance from the central position C to the central positions CR1, CR2, CB1 and CB2 of the light-emitting diodes R1, R2, B 1 and B2 around the central position C should be selected to be less than 2 mm.

Figure 4:
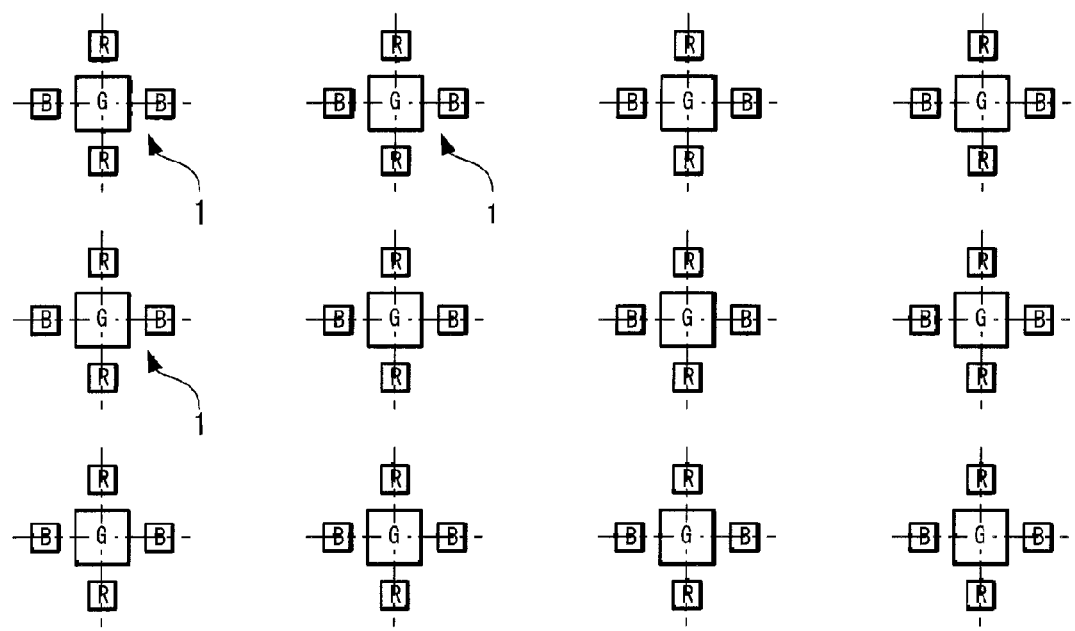
FIG. 4 is a plan view of a light source apparatus in which light-emitting diode units shown in FIG. 3 are disposed in an XY matrix fashion.

FIG. 4 is a plan view showing an example of a light source apparatus in which the light-emitting diode units 1 shown in FIG. 3 are disposed in an XY matrix fashion (that is, in a two-dimensional fashion).

A light source apparatus, generally depicted by reference numeral 2 in FIG. 4, includes the light-emitting diode units 1 shown in FIG. 3 disposed in the horizontal and vertical directions in an XY matrix fashion.

According to the above-mentioned arrangement of the light source apparatus 2 of this embodiment, each light-emitting diode unit 1 includes the two red light-emitting diodes R1 and R2 and the two blue light-emitting diodes B1 and B2. The central positions of the light-emitting diodes R, G and B for emitting lights of respective colors R (red), G (green) and B (blue) are matched with each other and the light-emitting diodes R, G and B for emitting lights of red, green and blue are disposed symmetrical with respect to the center C.

As a consequence, optical symmetry can be kept within the light-emitting diode unit 1 and hence it becomes possible to decrease unevenness in chromaticity and unevenness in brightness.

Also, in the light source apparatus 2 in which the light-emitting diode units 1 shown in FIG. 3 are disposed in an XY matrix fashion as shown in FIG. 4, it is possible to decrease unevenness in chromaticity among the respective light-emitting diode units 1.

Then, since unevenness in chromaticity can be decreased, even when the thickness of the light source apparatus 2 is decreased, an excellent chromaticity distribution can be obtained and hence it becomes possible to miniaturize the light source apparatus 2 by decreasing the thickness of the light source apparatus 2.

For example, when the light source apparatus 2 is constructed by using the light-emitting diode unit 1 having the aforementioned size and arrangement under the condition that the space between the central positions C of the respective light-emitting diode units 1 is selected to be approximately 20 mm, the light source apparatus 2 with the thickness of approximately 20 mm can provide white light by color mixing.

Further, according to the arrangement of the light source apparatus 2 of this embodiment, since luminous efficiency of the whole of the light-emitting diode unit 1 can be increased by increasing the chip area of the green light-emitting diode G of which light emission luminance is not sufficient and whose luminous efficiency is low, the number of the light-emitting diode units 1 required by the light source apparatus 2 to obtain desired brightness can be decreased and hence it becomes possible to decrease the number of chips in the light source apparatus 2.

The light source apparatus 2 shown in FIGS. 3 and 4 may be suitable for use as the application to illumination apparatus, projector light source, backlight apparatus of color liquid-crystal display apparatus and the like.

Then, since the light source apparatus 2 having the arrangement shown in FIGS. 3 and 4 can decrease unevenness in chromaticity and provide an excellent white light source, this light source apparatus 2 may be suitable for use as the above-mentioned applications.

Figure 5:
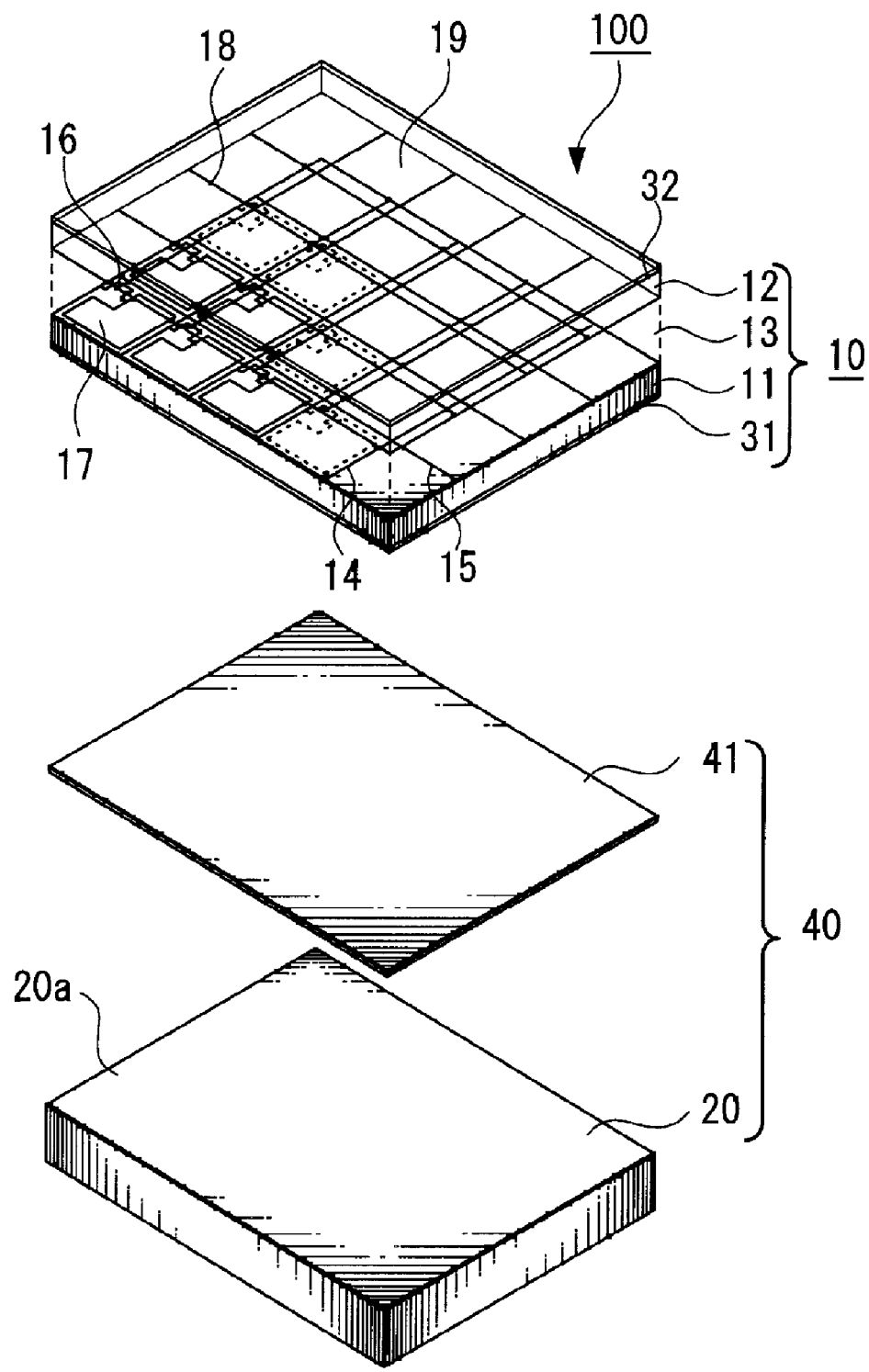
FIG. 5 is a schematic diagram (exploded perspective view) showing an arrangement of an example of a color liquid-crystal display apparatus including a light source apparatus as a backlight light source thereof.

A color liquid-crystal display apparatus can be configured by applying the light source apparatus 2 having the arrangement shown in FIGS. 3 and 4 to the backlight apparatus as shown in FIG. 5. FIG. 5 is a schematic arrangement diagram, that is, an exploded perspective view of the color liquid-crystal display apparatus.

A color liquid-crystal display panel, generally depicted by reference numeral 100 in FIG. 5, includes a transmission type color liquid-crystal display panel 10 and a backlight unit 40 provided at the back side of this color liquid-crystal display panel 10.

As shown in FIG. 5, the transmission color liquid-crystal display panel 10 includes two transparent substrates (TFT (thin film transistor) substrate 11 and opposing electrode substrate 12) made of a suitable material such as glass disposed in an opposing fashion and a liquid-crystal layer 13, in which TN (twisted nematic) liquid-crystal is included, disposed between the two transparent substrates 11 and 12. Thin film transistors (TFTs) 16 serving as switching elements disposed in an XY matrix fashion and pixel electrodes 17 are formed on the TFT substrate 11.

The thin film transistor 16 is sequentially selected by a scanning line 15 and it is able to write a video signal supplied from a signal line 14 in the corresponding pixel electrode 17.

A color filter 19 is divided to provide segments corresponding to respective segments, although not shown. For example, the color filter 19 is divided into three segments of a red filter, a green filter and a blue filter which are three primary colors.

This color liquid-crystal display apparatus 100 is able to display desired full color pictures by driving the transmission type color liquid-crystal display panel 10 in an active matrix system in the state in which the transmission type color liquid-crystal display panel 10 is sandwiched by two sheet polarizers 31 and 32 and in which the transmission type color liquid-crystal display panel 10 is illuminated with white light from the back side by a backlight unit 40.

The backlight unit 40 is adapted to illuminate the transmission type color liquid-crystal panel 10 from the back side. As shown in FIG. 5, the backlight unit 40 includes a backlight apparatus 20 equipped with a light source to surface-emit white light, obtained by mixing lights of respective colors from the light source, from a light irradiation surface 20a and a diffuser 41 laminated on the light irradiation surface 20a of this backlight apparatus 20.

The diffuser 41 is able to uniform brightness in surface-emission by diffusing white light emitted from the light irradiation surface 20a.

Then, the backlight apparatus 20 is constructed by disposing the light-emitting-diode units 1, each of which is formed of R, G and B light-emitting diodes of three colors of red, green and blue as shown in FIG. 4, in an XY matrix fashion.

In consequence, since unevenness in chromaticity and unevenness in brightness are decreased in each light-emitting diode unit 1, unevenness in brightness and unevenness in chromaticity of the backlight apparatus 20 can be suppressed from influencing an image displayed on the transmission type color liquid-crystal panel 10, whereby distributions of brightness and chromaticity of the image can be made excellent.

Accordingly, it is possible to display an image to be displayed with excellent image quality.

Since it is unavoidable that a wavelength of light emitted from the red light-emitting diode is considerably changed due to rise of temperature when the red light-emitting diode is energized to emit light of red light, it is necessary to limit an electric current to a low electric current required to energize the red light-emitting diode.

To this end, it is considered that a light-emission area should be increased so that sufficient brightness can be obtained by a smaller electric current.

Then, the arrangement of the light-emitting diode unit 1 shown in FIGS. 3 and 4 may be modified so that the red light-emitting diode R has a chip area larger than that of the blue light-emitting diode B to provide a larger light-emission area.

A relationship among the chip areas of the red light-emitting diode R, the green light-emitting diode G and the blue light-emitting diode B in the light-emitting diode 1 is not limited to the relationship expressed as G>(R, B) shown in FIGS. 3 and 4 and various relationships may be possible.

As described above, relationships expressed as (G, R)>B, G>R>B and R>G>B may be considered as the arrangements in which the red light-emitting diode R has the chip area larger than that of the blue light-emitting diode B.

Figure 6:
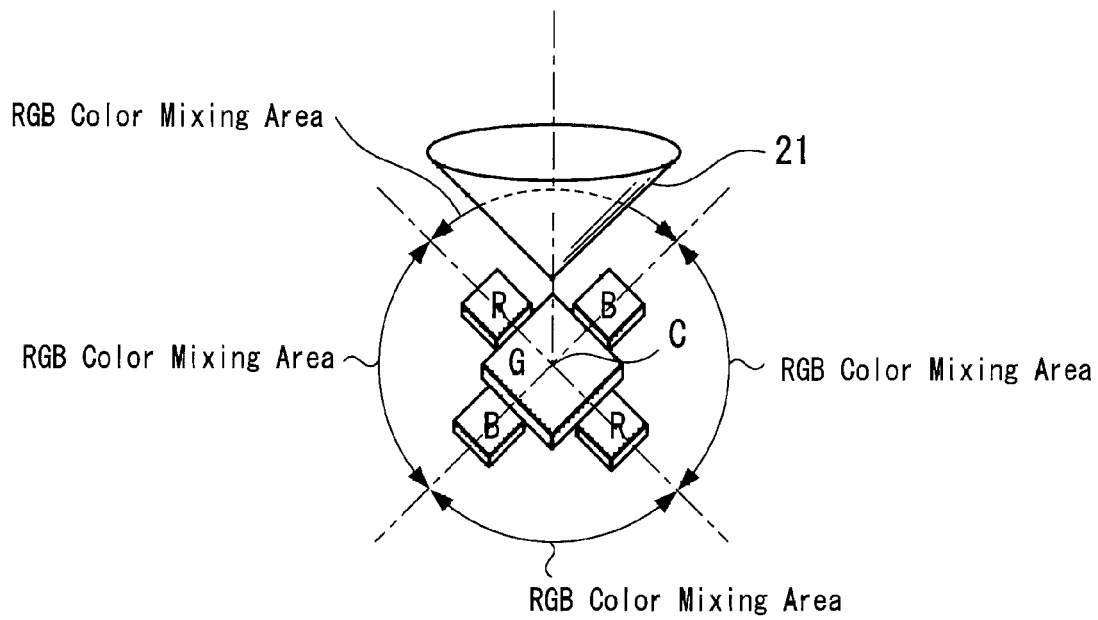
FIG. 6 is a perspective view showing a main portion of a light source apparatus according to a second embodiment of the present invention.

Next, FIG. 6 shows a schematic arrangement diagram (perspective view of a main portion) of a light source apparatus according to a second embodiment of the present invention.

In this embodiment, lights emitted from the light-emitting diodes R, G and B are changed in direction to substantially the horizontal direction by using a conic reflective surface.

As shown in FIG. 6, the light-emitting diodes R, G and B for emitting lights of three colors, red, green and blue are disposed in a manner similar to that of the light-emitting diode unit 1 shown in FIG. 3 and an optical member 21 having a conic reflective surface is disposed over the central position C of the light-emitting diodes R, G and B such that its vertex is oriented to the downward direction, thereby a light-emitting diode unit 3 being constructed.

Then, a light source apparatus is constructed by disposing a large number of light-emitting diode units 3 in an XY matrix fashion.

Figure 1A:
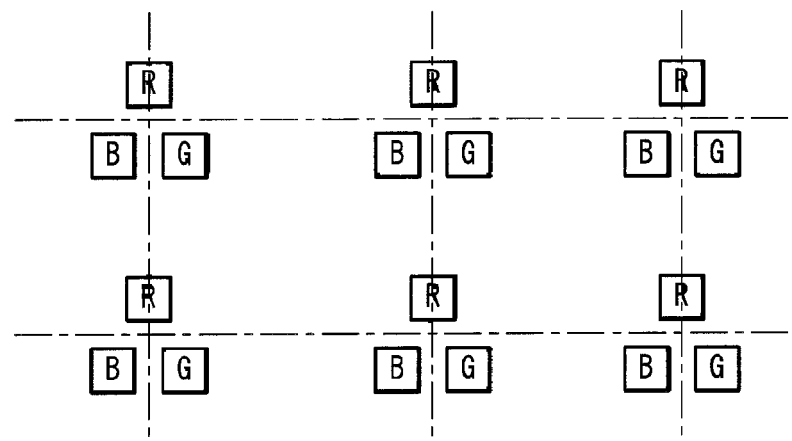
FIG. 1A is a plan view showing a light source apparatus according to the related art in which light-emitting diode chips of three colors are arrayed in a delta fashion.
Figure 1B:
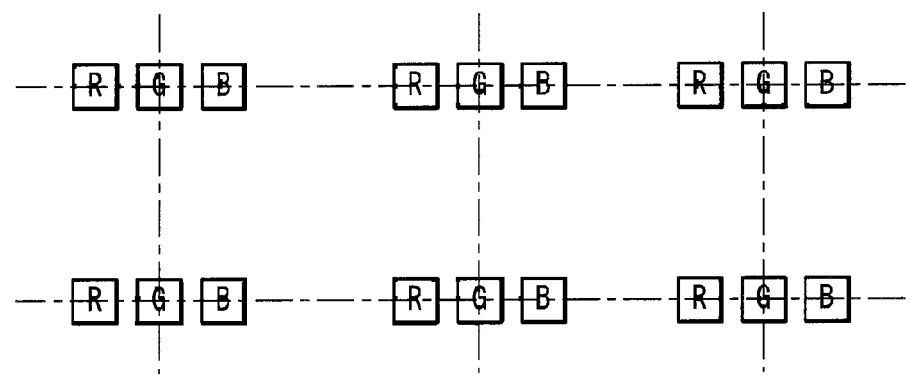
FIG. 1B is a plan view showing a light source apparatus according to the related art in which three light-emitting diode chips of three colors are arrayed in an in-line fashion.
Figure 2A:
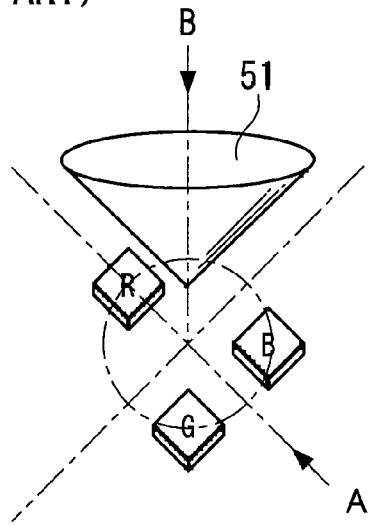
FIG. 2A is a perspective view showing a light source apparatus according to the related art in which a substantially conic reflective surface is located relative to a set of three color light-emitting diodes.
Figure 2B:
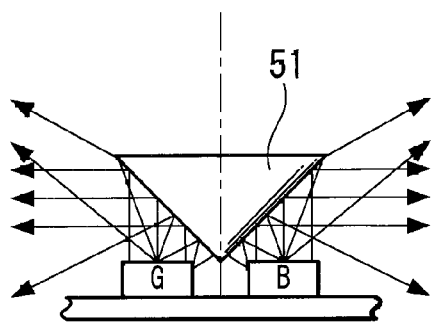
FIG. 2B is a cross-sectional view showing the related-art light source apparatus from the direction shown by an arrow A in FIG. 2A.
Figure 2C:
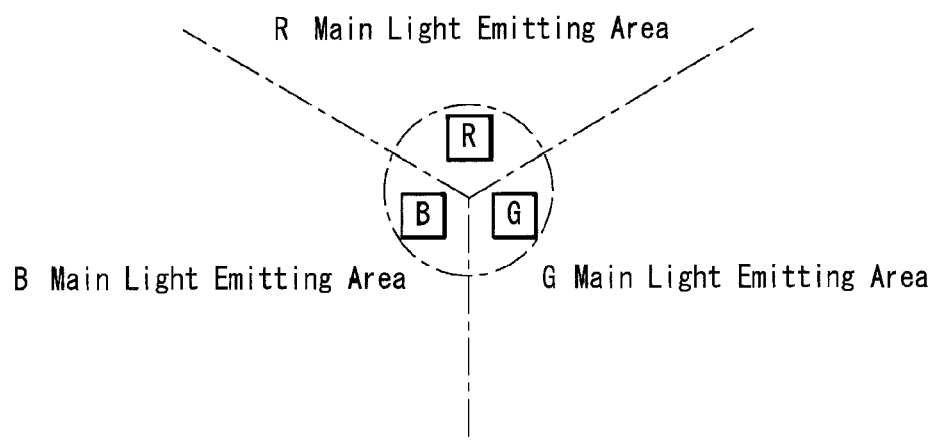
FIG. 2C is a plan view showing the related-art light source apparatus from the direction shown by an arrow B in FIG. 2A.

In the RGB color mixing area with an angle of 90 degrees shown by arrows in FIG. 6, the area shares ¼ of the green light-emitting diode G, the area shares ½ of the red light-emitting diode R and the area shares ½ of the blue light-emitting diode B, respectively. Therefore, lights of respective colors R, G and B can be mixed in a well-balanced fashion so that light of a particular color can be prevented from being emitted with large intensity (that is, brightness and chromaticity of such a particular color can be prevented from becoming uneven) unlike the R, G and B main light-emitting areas shown in FIG. 2C.

Accordingly, it becomes possible to decrease unevenness in chromaticity can be decreased while brightness balance of lights of respective red, green and blue colors R, G and B may be maintained.

According to the above-mentioned arrangement of this embodiment, the light-emitting diodes for emitting lights of three colors are disposed similarly to the light-emitting diode unit 1 shown in FIG. 3. That is, the central positions of the light-emitting diodes R, G and B for emitting lights of red, green and blue are matched with each other and the light-emitting diodes for emitting lights of red, green and blue are disposed symmetrically with respect to the center C.

As a result, optical symmetry can be maintained within the light-emitting diode unit 3 and hence it becomes possible to decrease unevenness in chromaticity.

Also, in the light source apparatus in which the light-emitting diode units 3 shown in FIG. 6 are disposed in an XY matrix fashion, it is possible to decrease unevenness in chromaticity among the respective light-emitting diode units 3.

Then, since the chip area of the green light-emitting diode G with low luminous efficiency is set to be larger than those of the light-emitting diodes R and B of other colors, it is possible to improve luminous efficiency in the whole of the light-emitting diode unit 3. Consequently, since the number of the light-emitting diode units 3 required by the light source apparatus to obtain desired brightness can be decreased, it becomes possible to decrease the number of the chips in the light source apparatus.

Further, since the optical member 21 having the conic reflective surface is disposed above the central position C of the light-emitting diodes R, G and B for emitting lights of red, green and blue, lights of respective colors R, G and B can be mixed in a well-balanced fashion and hence brightness balance of respective colors R, G and B can be maintained. From this point of view, it becomes possible to decrease unevenness in chromaticity.

Also, since unevenness in chromaticity can be decreased, even when the light source apparatus is decreased in thickness, an excellent chromaticity distribution can be obtained and hence it becomes possible to miniaturize the light source apparatus by decreasing the thickness of the light source apparatus.

Further, since emitted lights traveling in the direction substantially perpendicular to the substrate can be changed in direction to the substantially horizontal direction nearly parallel to the substrate and radiated by the conic reflective surface of the optical member 21, from this point of view, it becomes possible to miniaturize the light source apparatus by decreasing the thickness of the light source apparatus.

While the chip area of the green light-emitting diode G is made larger than those of the light-emitting diodes R and B for emitting lights of red and blue and two light-emitting diodes R and B for emitting lights of red and blue each are disposed to construct the light-emitting diode unit 3 in the embodiment shown in FIG. 6, the present invention is not limited thereto and the chip area and the number of chips can be changed variously.

Then, it is desirable that the chip area and the number of chips should be increased with respect to colors of light with low luminous efficiency and colors of light with high required brightness as compared with other colors of lights. As a consequence, since luminous efficiency of the whole of the light-emitting diode unit can be increased, the number of the light-emitting diode units necessary for the light source apparatus can be decreased and the number of the chips in the whole of the light source apparatus can be decreased, whereby the cost of the light source apparatus can be decreased.

The light source apparatus according to the embodiment of the present invention in which a large number of the light-emitting diode units 3 shown in FIG. 6 are disposed in an XY matrix fashion is suitable for use as the application to the illumination light source, the projector light source, the backlight apparatus of the color liquid-crystal display apparatus and the like.

Then, since the light source apparatus is able to decrease unevenness in chromaticity and becomes the excellent white light source, this light source apparatus is suitable for use as the application to the above-mentioned apparatus.

The light source apparatus according to this embodiment can be applied to the backlight apparatus 20 of the color liquid-crystal display apparatus 100 shown in FIG. 5.

Since the light source apparatus according to this embodiment uses the optical member 21 having the conic reflective surface so that the light source apparatus can be decreased in thickness, when this light source apparatus is applied to the color liquid-crystal display apparatus 100 shown in FIG. 5, it becomes possible to decrease the thickness of the direct type backlight apparatus 20.

Figure 7:
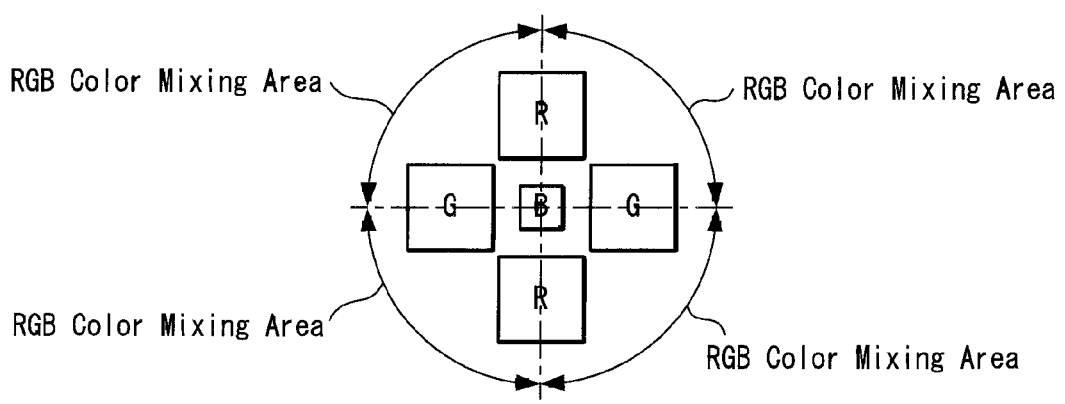
FIG. 7 is a plan view showing a main portion of a light source apparatus according to a third embodiment of the present invention.

Next, FIG. 7 shows a schematic arrangement diagram (plan view of a main portion) of a light source apparatus according to a third embodiment of the present invention.

As shown in FIG. 7, two red light-emitting diodes R, two green light-emitting diodes G and one blue light-emitting diode B are disposed in such a manner that central positions of respective colors R, G and B may become coincident with each other and that they become symmetrical with respect to the central position.

Also, although not shown, similarly to the embodiment shown in FIG. 6, an optical member having a conic reflective surface is disposed over the central positions of the light-emitting diodes R, G and B to thereby construct a light-emitting diode unit 4.

In this embodiment, as shown in FIG. 7, the chip areas of the red light-emitting diode R and the green light-emitting diode G are increased and the chip area of the central blue light-emitting diode B is decreased comparatively.

Also in this case, since three colors can be mixed in the RGB color mixing area with an angular range of 90 degrees by a reflective surface of an optical member having a conic reflective surface, brightness balance of the respective colors R, G and B can be maintained and it becomes possible to decrease unevenness in chromaticity.

Then, since the chip area of the red light-emitting diode R also is selected to be large, sufficiently high brightness can be obtained even by a small electric current. Thus, while limiting a magnitude of an electric current to energize the red light-emitting diode R, it is possible to decrease an amount in which a wavelength of red light is changed as temperature of the red light-emitting diode R is raised when the red light-emitting diode R is energized to emit red light.

The light source apparatus according to the embodiment of the present invention in which a large number of the light-emitting diode units 3 shown in FIG. 6 are disposed in an XY matrix fashion is suitable for use as the application to the illumination light source, the projector light source, the backlight apparatus of the color liquid-crystal display apparatus and the like.

Then, since the light source apparatus is able to decrease unevenness in chromaticity and becomes the excellent white light source, this light source apparatus is suitable for use as the application to the above-mentioned apparatus.

The light source apparatus according to this embodiment can be applied to the backlight apparatus 20 of the color liquid-crystal display apparatus 100 shown in FIG. 5.

Modified examples of the embodiment shown in FIG. 7 will be described with reference to FIGS. 8 and 9.

Figure 8:
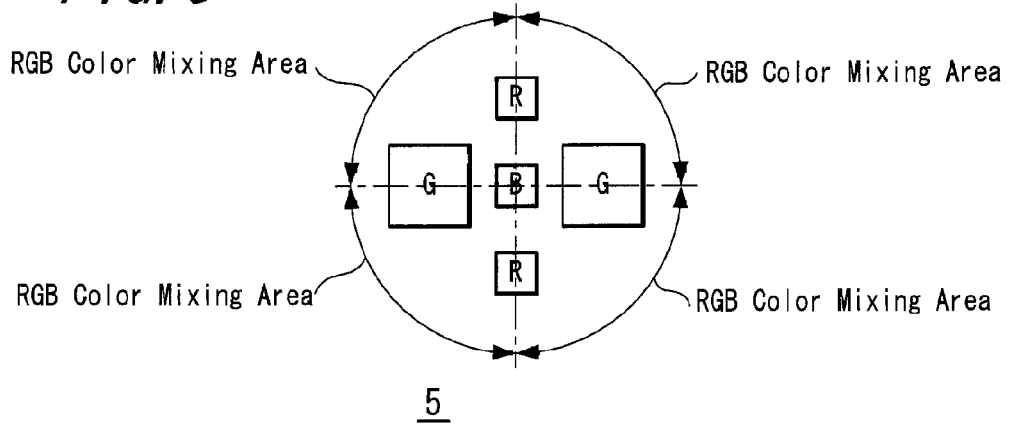
FIG. 8 is a plan view showing a main portion of one modified example of the light source apparatus shown in FIG. 7.

In the modified example shown in FIG. 8, the chip area of the green light-emitting diode G is increased and the red light-emitting diode R is selected to be the same as the blue light-emitting diode B in chip area, thereby resulting in a light-emitting diode unit 5 being constructed. In this case, since the chip area of only the green light-emitting diode G is increased, it is considered that actions similar to those of the embodiment shown in FIG. 6 can be achieved.

Figure 9:
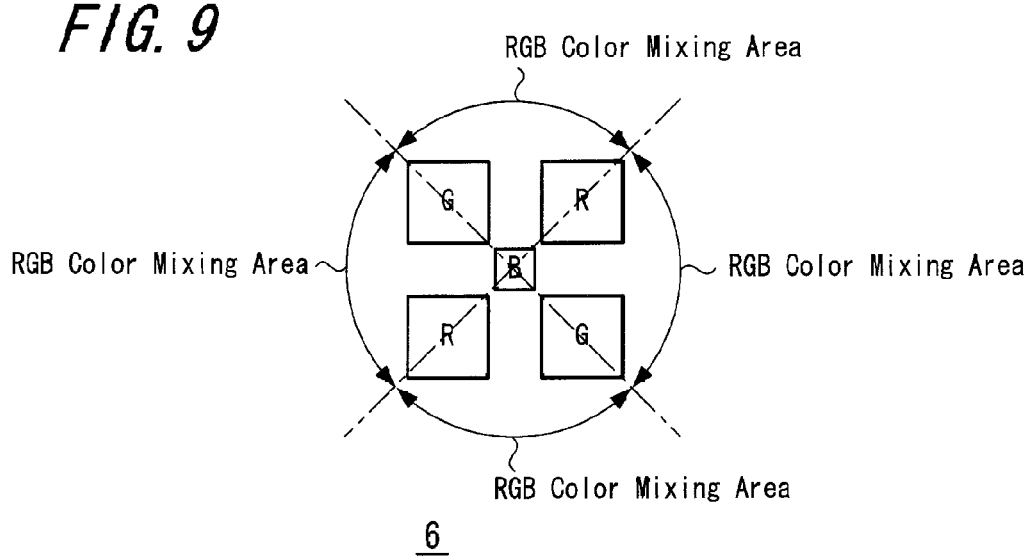
FIG. 9 is a plan view showing a main portion of other modified example of the light source apparatus shown in FIG. 7.

In the modified example shown in FIG. 9, the green light-emitting diode G and the red light-emitting diode R of which chip areas are increased are disposed obliquely relative to the blue light-emitting diode B located at the central position to thereby construct a light-emitting diode unit 6. In this case, the modified example shown in FIG. 9 is different from the arrangement shown in FIG. 7 only in that boundaries of the four RGB color mixing areas are changed to the slanting directions with similar action and effects being achieved.

It is possible to construct a light-emitting diode unit without conic reflecting material by using the arrangements of the light-emitting diodes R, G and B of three colors of the modified examples shown in FIGS. 8 and 9 similarly to FIG. 3.

In that case, in colors of lights provided by the increased chip area, action and effects achieved by the increased chip areas can be obtained.

Figure 10:
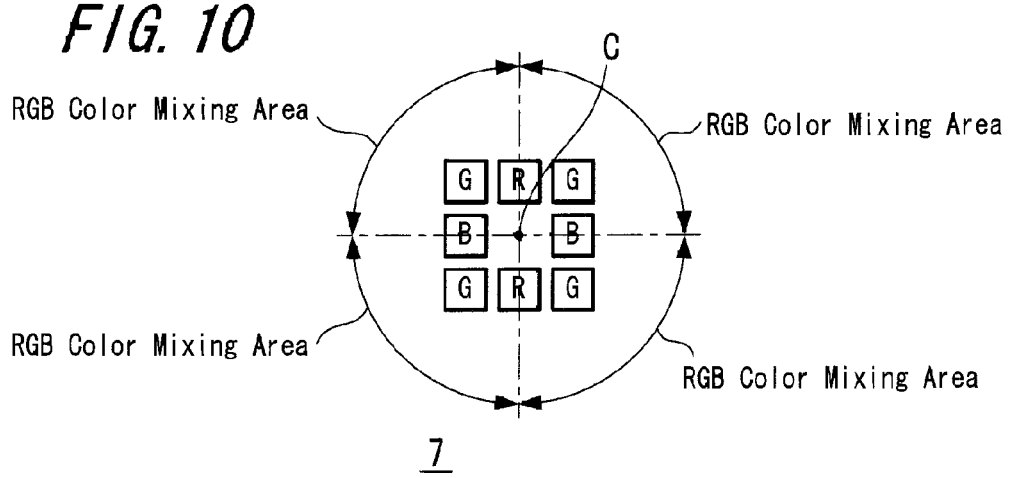
FIG. 10 is a plan view showing a main portion of a light source apparatus according to a fourth embodiment of the present invention.

Next, FIG. 10 shows a schematic arrangement diagram (plan view of a main portion) of a light source apparatus according to a fourth embodiment of the present invention. In this embodiment, in order to achieve desired chromaticity of white while the light-emitting diodes of respective colors are being driven with excellent luminous efficiency, the number of chips is increased without changing the chip areas of the light-emitting diodes of respective colors so that brightness balance of respective colors of lights in the RGB color mixing area can be maintained to decrease unevenness in chromaticity.

As shown in FIG. 10, two red light-emitting diodes R, four green light-emitting diodes G and two blue light-emitting diodes B are disposed in such a manner that the central positions C of the respective colors R, G and B of emitted lights are matched with each other and that those light-emitting diodes R, G and B are disposed symmetrically with respect to this center position C.

Also, although not shown, similarly to the embodiment shown in FIG. 6, an optical member having a conic reflective surface is disposed over the central positions of the light-emitting diodes R, G and B, thereby resulting in a light-emitting diode unit 7 being configured.

In this embodiment, the chip areas of the respective light-emitting diodes R, G and B are selected to be the same.

Also, the number of the green light-emitting diodes G is selected to be twice the number of other light-emitting diodes R and B. In each RGB color mixing area with an angle of 90 degrees shown by arrows in FIG. 10, the area shares one time of the green light-emitting diode G, the area shares ½ of the red light-emitting diode R and the area shares ½ of the blue light-emitting diode B, respectively. Thus, the area of the green light-emitting diode G is twice as large as the areas of the light-emitting diodes R and B of other colors. Therefore, lights of respective colors R, G and B can be mixed in a well-balanced fashion so that it becomes possible to decrease unevenness in chromaticity while balance of brightness in respective colors R, G and B of emitted lights can be maintained.

Further, while the central positions C of the light-emitting diodes R, G and B of lights of respective colors are matched with each other in this embodiment, a light-emitting diode is not provided at the central position C at all.

As described above, since no light-emitting diode exists at the central position C at which the central axis of the conic reflective surface is located, as compared with the arrangement in which the light-emitting diode exists at the position in which the central axis of the conic reflective surface is located, a difference between the relative positions of the light-emitting diodes R, G and B of respective lights of red, green and blue and the relative position of the conic reflective surface can be decreased and the radiation angles obtained after lights emitted from the light-emitting diodes R, G and B for emitting lights of red, green and blue were reflected on the conic reflective surface can be substantially matched with each other.

As a result, it becomes possible to more effectively decrease unevenness in chromaticity.

The light source apparatus according to the embodiment of the present invention in which a large number of the light-emitting diode units 7 shown in FIG. 10 are disposed in an XY matrix fashion is suitable for use as the application to the illumination light source, the projector light source, the backlight apparatus of the color liquid-crystal display apparatus and the like.

Then, since the light source apparatus is able to decrease unevenness in chromaticity and becomes the excellent white light source, this light source apparatus is suitable for use as the application to the above-mentioned apparatus.

The light source apparatus according to this embodiment can be applied to the backlight apparatus 20 of the color liquid-crystal display apparatus 100 shown in FIG. 5.

Figure 11A:
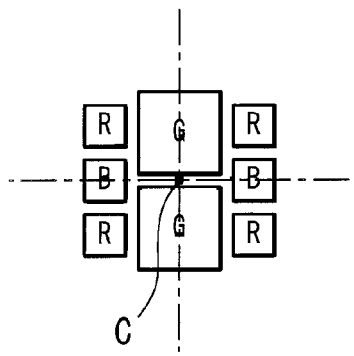
FIGS. 11A, 11B and 11C are plan views showing main portions of modified examples of the light source apparatus shown in FIG. 10, respectively.
Figure 11B:
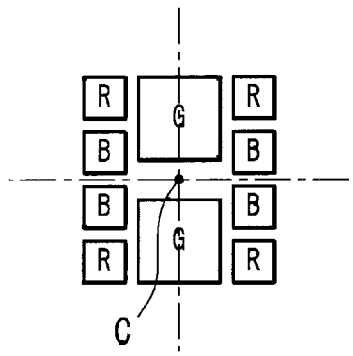
Figure 11C:
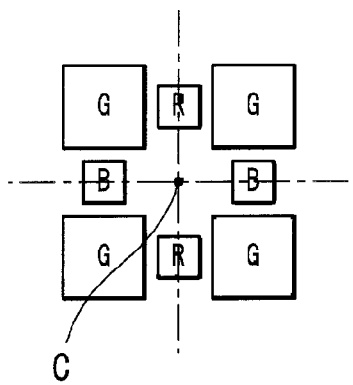

FIGS. 11A, 11B and 11C show modified examples of the embodiment shown in FIG. 10 in which the chip area of the green light-emitting diode G is increased to become larger than those of the light-emitting diodes R and B of lights of other colors, that is, red and blue. Any of the modified examples shown in FIGS. 11A, 11B and 11C is common to the embodiment shown in FIG. 10 in that no light-emitting diode is provided at the central positions C of the light-emitting diodes R, G and B for emitting lights of red, green and blue.

Also, in the modified examples shown in FIGS. 11A, 11B and 11C, although not shown, similarly to the embodiment shown in FIG. 6, an optical member having a conic reflective surface is disposed over the central positions C of the light-emitting diodes R, G and B to thereby construct light-emitting diode units.

FIG. 11A shows the modified example in which there are provided four red light-emitting diodes R and two green light-emitting diodes G and the positions of these red and green light-emitting diodes R and G replace the positions shown in FIG. 10 to thereby increase the chip area of the green light-emitting diode G. In the whole of the light-emitting diode unit and the RGB color mixing area with an angle of 90 degrees, the chip areas of the red, green and blue light-emitting diodes R, G and B may satisfy a relationship expressed as G>R>B.

FIG. 11B shows the modified example in which there are provided four red light-emitting diodes R, four blue light-emitting diodes B and two green light-emitting diodes G and the positions of these red and green light-emitting diodes R and G are changed a little from the positions shown in FIG. 11A to thereby increase the chip area of the green light-emitting diode G. In this case, the numbers and chip areas of the red light-emitting diodes R and the blue light-emitting diode B are selected to be the same, and in the whole of the light-emitting diode unit and the RGB color mixing area with an angle of 90 degrees, the chip areas of the red, green and blue light-emitting diodes R, G and B may satisfy a relationship expressed as G>(R, B).

FIG. 11C shows the modified example in which the numbers of the light-emitting diodes R, G and B for emitting lights of respective colors of red, green and blue are selected to be the same and a positional relationship among the respective red, green and blue light-emitting diodes R, G and B is changed a little from that shown in FIG. 10 to thereby increase the chip area of the green light-emitting diode G. In the RGB color mixing area with an angle of 90 degrees, a difference between the chip area of the green light-emitting diode G and the chip areas of the light-emitting diodes R and B of lights of other colors, that is, red and blue is larger than that shown in FIG. 10.

Figure 12:
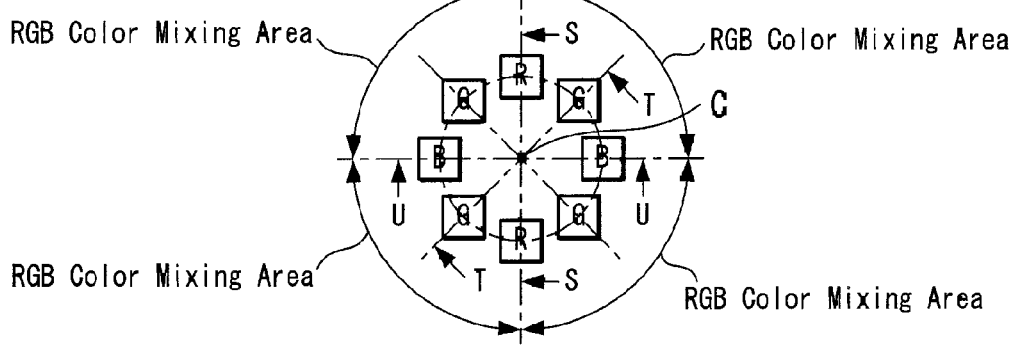
FIG. 12 is a plan view showing a main portion of a further modified example of the light source apparatus shown in FIG. 10.

Next, FIG. 12 shows a modified example of the embodiment shown in FIG. 10 in which the respective red, green and blue light-emitting diodes R, G and B are disposed at the positions with an equal distance from the central position C.

In the arrangement shown in FIG. 12, the light-emitting diodes R, G and B for emitting lights of red, green and blue colors are disposed at the positions distant from the central position C with an equal distance.

Also, similarly to the embodiment shown in FIG. 6, the optical member 21 having the conic reflective surface is located over the central positions C of the light-emitting diodes R, G and B for emitting red, green and blue lights.

Since the light-emitting diodes R, G and B for emitting red, green and blue lights are disposed at the positions distant from the central position C with the equal distance, relative positions of the light-emitting diodes R, G and B with respect to the conic reflective surface of the optical member 21 become equal to each other and hence it becomes possible to more effectively decrease unevenness in chromaticity.

Figure 13A:
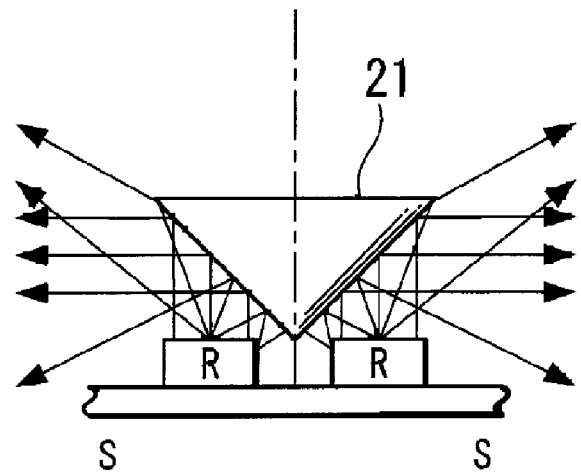
FIG. 13A is a cross-sectional view taken along the dot-and-dash line shown by arrows S-S in FIG. 12.
Figure 13B:
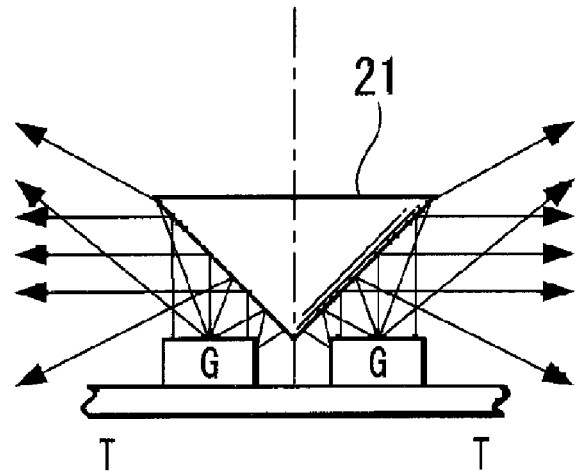
FIG. 13B is a cross-sectional view taken along the dot-and-dash line shown by arrows T-T in FIG. 12.
Figure 13C:
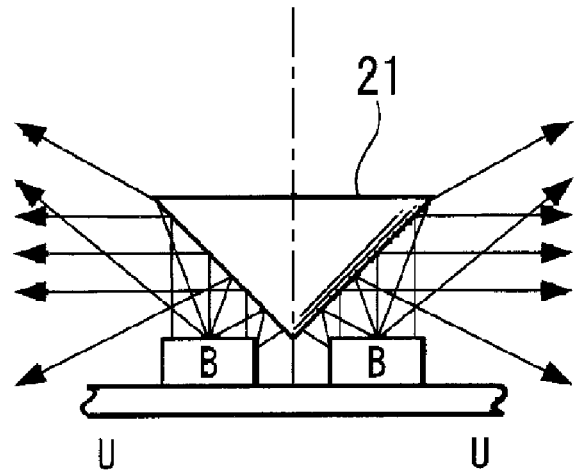
FIG. 13C is a cross-sectional view taken along the dot-and-dash line shown by arrows U-U in FIG. 12.

FIG. 13A is a cross-sectional view taken along the dot-and-dash line shown by arrows S and S in FIG. 12, FIG. 13B is a cross-sectional view taken along the dot-and-dash line shown by arrows T and T in FIG. 12 and FIG. 13C is a cross-sectional view taken along the dot-and-dash line shown by arrows U and U in FIG. 12. As shown in FIGS. 13A, 13B and 13C, it is to be understood that lights emitted from the light-emitting diodes R, G and B for emitting red, green and blue lights are reflected substantially similarly by the conic reflective surface of the optical member 21.

Figure 14:
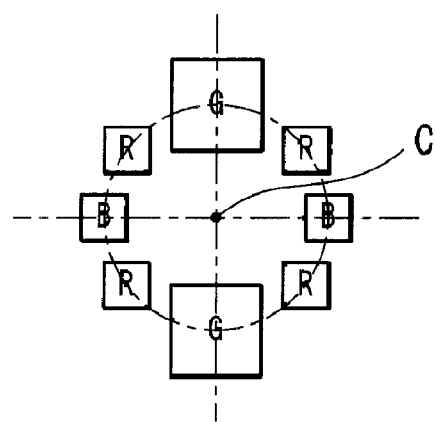
FIG. 14 is a plan view showing a main portion of yet a further modified example of the light source apparatus shown in FIG. 11A.

Also, FIG. 14 shows a further modified example of the embodiment shown in FIG. 11A in which the respective red, green and blue light-emitting diodes R, G and B are disposed at the positions distant from the central position C with an equal distance. Also in this case, although not show, similarly to the embodiment shown in FIG. 6, an optical member having a conic reflective surface is disposed over the central positions of the red, green and blue light-emitting diodes R, G and B.

In this case, similarly to the embodiment shown in FIG. 11A, action and effects achieved when the chip area of the green light-emitting diode G is increased can be obtained. At the same time, since the light-emitting diodes R, G and B of red, green and blue lights are disposed at the positions distant from the central position C with the equal distance, the relative positions of the red, green and blue light-emitting diodes R, G and B relative to the conic reflective surface of the optical member become equal to each other, it becomes possible to more effectively decrease unevenness in chromaticity.

Next, arrangements of light-emitting diodes for emitting lights of respective colors which will not give rise to a problem unless they are not combined with the conic reflective surface of the optical member but which should not be preferable if they are combined with the conic reflective surface of the optical member will be described below as arrangements of comparative examples for the present invention.

Figure 15:
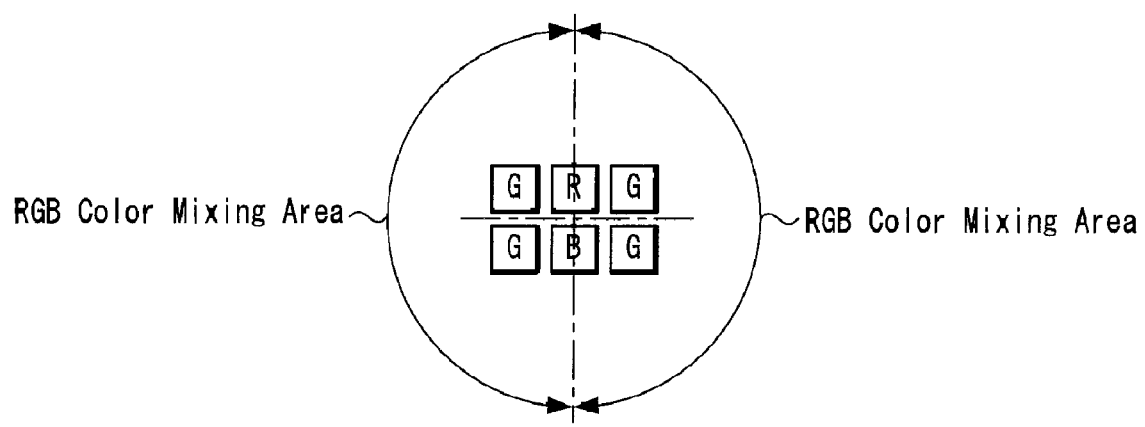
FIG. 15 is a plan view showing a main portion of a light source apparatus of a comparative example in which central positions of respective colors are not matched with the central position of the whole of the light source apparatus.

FIG. 15 shows an arrangement in which one red light-emitting diode R, one blue light-emitting diode B, four green light-emitting diodes G are provided and no light-emitting diode is provided at the central position of the whole arrangement.

The central position of the green light-emitting diode G is matched with the central position of the whole arrangement. On the other hand, the red light-emitting diode R is disposed on the upper side of the central position, the blue light-emitting diode B is disposed on the lower side of the central position and the central positions of respective colors are not matched with the central position of the whole arrangement.

According to the arrangement shown in FIG. 15, when this arrangement is not combined with the conic reflective surface of the optical member, color mixing of red, green and blue is possible. However, when this arrangement is combined with the conic reflective surface of the optical member, color mixing of red, green and blue may not be carried out sufficiently, which is not preferable.

More specifically, light emitted from the blue light-emitting diode B is interrupted by the conic reflective surface of the optical member and the emitted light becomes difficult to be radiated in the upper side of FIG. 15. In a like manner, light emitted from the red light-emitting diode R is interrupted by the conic reflective surface of the optical member and the emitted light becomes difficult to be radiated in the lower side of FIG. 15. As a result, intensity of emitted light that was blocked by the conic reflective surface is decreased and balance of color mixing is lost so that unevenness in chromaticity tends to occur.

Figure 17:
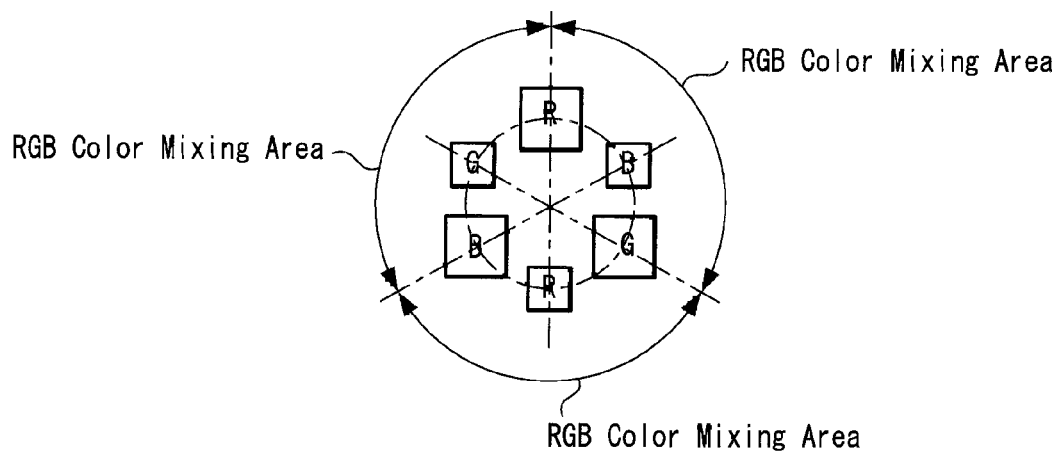
FIG. 17 is a plan view showing a main portion of a light source apparatus according to a fifth embodiment of the present invention.

In an arrangement shown in FIG. 17, the chip areas of two of the light-emitting diodes R, G and B of three colors are selected to be the same. Also, the respective light-emitting diodes R, G and B are disposed with an equal distance from the central position of the whole arrangement at an equal angular spacing.

Figure 16:
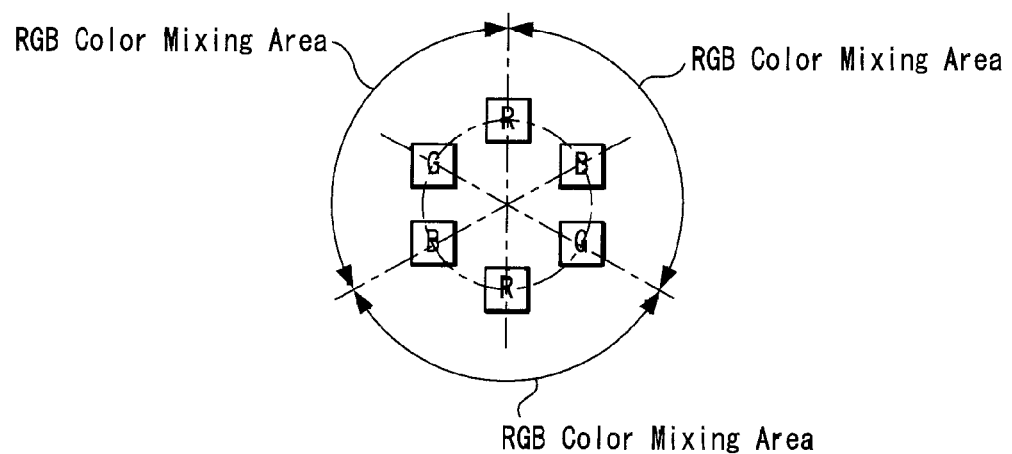
FIG. 16 is a plan view showing a main portion of a light source apparatus of a comparative example in which two of three light-emitting diodes are tailored to have the same chip area.

In this arrangement, as shown by arrows in FIG. 16, the RGB color mixing area may have an angular extent of 120 degrees.

According to the arrangement shown in FIG. 16, unless this arrangement is combined with the conic reflective surface of the optical member, then color mixing is possible. If on the other hand the above-mentioned arrangement is combined with the conic reflective surface of the optical member, color mixing may not be carried out sufficiently, which is not preferable.

More specifically, since the light-emitting diodes R, G and B of three colors of red, green and blue are disposed in exactly the equivalent manner, ratios of the chip areas of the respective emitted lights of colors red (R), green (G) and blue (B) in the RGB color mixing areas with an angle of 120 degrees are different in the three RGB color mixing areas. In the RGB color mixing area on the upper right side, the ratio of the chip area of the emitted light color of blue B is larger than those of other emitted lights of colors. In the RGB color mixing area on the upper left side, the ratio of the chip area of the emitted light color of blue B is larger than those of other lights of colors. In the RGB color mixing area on the lower side, the ratio of the chip area of the emitted light color of red R is larger than those of other emitted lights of colors.

For this reason, if two of the light-emitting diodes R, G and B of respective emitted lights of colors are driven by an equal driving current, then brightness balance differs at every RGB color mixing area so that intensity of light emitted from the light-emitting diode with the large ratio of the chip area is increased. Hence, color mixing becomes difficult to be carried out.

In the arrangement shown in FIG. 16, in order to make the brightness balances of the respective emitted lights of colors R, G and B in the RGB color mixing areas become equivalent, driving currents of the two light-emitting diodes of the same emitted light of color should be made different, which as a result makes a driving circuit become complex.

FIG. 17 is a plan view showing a main portion of a light source apparatus according to a fifth embodiment of the present invention in which the problem of the above-mentioned arrangement shown in FIG. 17 can be solved.

In the arrangement shown in FIG. 17, in order to make the driving currents of the two light-emitting diodes of the same emitted light of color become equal to each other, the chip areas of the two light-emitting diodes of the same emitted light of color are made different so that the ratios of the chip areas of the respective emitted lights of colors R, G and B become substantially equal to each other in the three RGB color mixing areas. To be concrete, the ratio of the chip areas of the two light-emitting diodes of the same emitted light of color is selected to be approximately 2:1.

Also, although not shown, similarly to the embodiment shown in FIG. 6, the optical member having the conic reflective surface is disposed over the central positions of the light-emitting diodes R, G and B.

According to the above-mentioned arrangement of this embodiment, since the chip areas of the two light-emitting diodes of the same emitted light of color are made different so that the ratios of the chip areas of the respective lights of colors R, G and B may become substantially equal to each other in the three RGB color mixing areas, even if the driving currents of the respective light-emitting diodes are selected to be the same, then it is possible to make the brightness balances of the respective emitted lights of colors R, G and B in the RGB color mixing areas become equal to each other.

Consequently, even when the driving currents of the respective light-emitting diodes are selected to be the same, it becomes possible to obtain white light without unevenness in chromaticity by easily mixing respective emitted lights of colors R, G and B. Therefore, a complex driving circuit is not required.

The light source apparatus according to this embodiment in which a large number of the light-emitting diode units shown in FIG. 17 are disposed in an XY matrix fashion is suitable for use as the application to the illumination light source, the projector light source, the backlight apparatus of the color liquid-crystal display apparatus and the like.

Then, since the light source apparatus becomes the excellent white light source, this light source apparatus is suitable for use as the application to the above-mentioned apparatus.

The light source apparatus according to this embodiment can be applied to the backlight apparatus 20 of the color liquid-crystal display apparatus 100 shown in FIG. 5.

When the above-mentioned light source apparatus according to the respective embodiments are applied to the backlight apparatus of the color liquid-crystal display apparatus and the like, lights changed in direction to substantially the horizontal direction (direction substantially parallel to the substrate) should further be changed again in position to the direction in which the display panel exists, that is, in the direction substantially perpendicular to the substrate by suitable devices such as a diffuser and a brightness increasing film.

While the light-emitting diodes R, G and B for emitting lights of three colors construct the light source apparatus in the respective embodiments of the present invention, the number of lights of colors to construct the white light source is not limited to three and at least more than two colors of lights may construct the white light source in the embodiments of the present invention.

However, when the light source apparatus according to the embodiments of the present invention is applied to the backlight apparatus of the color liquid-crystal display apparatus, the light source apparatus should include light-emitting diodes of more than three colors of R, G and B.

Also, according to the embodiments of the present invention, it is possible to use light-emitting diodes for emitting lights of colors other than red R, green G and blue B, for example. Light-emitting diodes for emitting lights of other colors may be combined with the light-emitting diodes for emitting lights of three colors of R, G and B.

Further, the number of the chips of the light-emitting diodes of respective lights of colors and the ratios of the chip areas can be variously modified in response to light-emission characteristics of light-emitting diodes of respective lights of colors, required illumination brightness and white chromaticity.

Furthermore, an optical assembly for changing the directions of lights emitted from the light-emitting diodes from the direction substantially perpendicular to the substrate is not limited to the optical member 21 having the substantially conic reflective surface and can be changed freely.

The shape of the reflective surface is not limited to the substantially conic shape and the present invention can use various shapes such as a spherical surface, an elliptic spherical surface, a cylindrical surface and a concave surface.

Also, instead of a member having a reflective surface, it may be possible to use an optical assembly for refracting light from a light-emitting device so that the refracted light may be changed in direction from the direction substantially perpendicular to the substrate to substantially the horizontal direction. For example, optical assemblies of various shapes such as a concave lens, a convex lens and a Fresnel lens can be applied to the present invention.

Also, the present invention is not limited to the case in which the light source apparatus is constructed by arraying the light-emitting diode units in an XY matrix fashion in order to use the light source apparatus as the direct type backlight apparatus and the illumination apparatus and the light source apparatus may be constructed by only a white LED package formed of a light-emitting diode unit in which light-emitting diodes of respective lights of colors are disposed.

While the light-emitting diode (LED) was used as the light-emitting device in the above-mentioned respective embodiments of the present invention, the present invention is not limited thereto and a light source apparatus can be configured by using other light-emitting devices. For example, it is possible to use semiconductor lasers and the like as the light-emitting device.

Then, it is possible to construct a light-emitting device group equivalent to the light-emitting diode units of the above-mentioned embodiments of the present invention by using light-emitting devices for emitting a plurality of lights of colors.

Also, the display apparatus according to the embodiments of the present invention is not limited to the color liquid-crystal display apparatus shown in FIG. 5 and other arrangements than an arrangement in which a display portion is formed of other portions and elements than the liquid-crystal display panel may be used insofar as a display apparatus includes a display portion for displaying images (including images with only characters) and a backlight.

In addition to the arrangement such as the liquid-crystal display apparatus for passing light from the backlight light source, the present invention can be applied to an arrangement in which a display portion emits light spontaneously so long as the display portion of the display apparatus uses a backlight light source as an auxiliary light source to increase brightness.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A light source apparatus comprising:
    a light-emitting device group composed of a plurality of light-emitting diode chips for emitting lights of at least three colors, wherein for each of the at least three colors, the light-emitting diode chips for emitting light of that color form a light-emitting device color set, and wherein the light-emitting diode chips are located close to each other and are disposed symmetrically with respect to a central point such that, for each light-emitting device color set, a central position of the light-emitting diode chips forming the light-emitting device color set is coincident with the central point.

2. A light source apparatus according to claim 1, wherein said light source apparatus includes a plurality of said light-emitting device groups.

3. A light source apparatus according to claim 1, wherein said light-emitting device group includes an optical member having a substantially conical reflective surface disposed over said central point to reflect or refract light emitted from the light-emitting diode chips so that a radiated direction of said emitted light is changed.

4. A light source apparatus according to claim 3, wherein said light-emitting device group does not include a light-emitting diode chip disposed at said central point.

5. A light source apparatus according to claim 3, wherein said light-emitting device group includes said light-emitting diode chips disposed from said central point at an equal distance.

6. A light source apparatus according to claim 1, wherein said light-emitting device group includes at least a light-emitting diode chip for emitting red light, a light-emitting diode chip for emitting green light and a light-emitting diode chip for emitting blue light.

7. A light source apparatus according to claim 6, wherein said light-emitting device group includes a plurality of light-emitting diode chips for emitting green lights.

8. A light source apparatus according to claim 6, wherein said light-emitting device group includes a plurality of light-emitting diode chips for emitting red lights and a plurality of light-emitting diode chips for emitting green lights.

9. A light source apparatus according to claim 1, wherein said light-emitting device group includes said light-emitting diode chips for emitting lights of said at least three colors in which a light-emitting diode chip for emitting light of one color has an area larger than those of light-emitting diode chips for emitting lights of other colors.

10. A light source apparatus according to claim 6, wherein said light-emitting diode chip for emitting green light has an area larger than those of light-emitting diode chips for emitting lights of other colors.

11. A light source apparatus according to claim 6, wherein said light-emitting diode chip for emitting green light and said light-emitting diode chip for emitting red light each have areas larger than that of said light-emitting diode chip for emitting blue light.

12. A display apparatus comprising:
    a display portion; and
    a light source apparatus for illuminating said display portion from a back side, wherein said light source apparatus includes a light-emitting device group composed of a plurality of light-emitting diode chips for emitting lights of at least three colors, wherein for each of the at least three colors, the light-emitting diode chips for emitting light of that color form a light-emitting device color set, and wherein the light-emitting diode chips are located close to each other and are disposed symmetrically with respect to a central point such that, for each light-emitting device color set, a central position of the light-emitting diode chips forming the light-emitting device color set is coincident with the central point.

13. A display apparatus according to claim 12, wherein said display portion is a color liquid-crystal display panel.

14. A light source apparatus according to claim 1, wherein one of the light-emitting diode chips is disposed at said central point.

15. A light source apparatus according to claim 14, wherein said light-emitting device group further includes four light-emitting devices-diode chips disposed from said central point at an equal distance.

16. A display apparatus according to claim 12, wherein one of the light-emitting diode chips is disposed at said central point.

17. A display apparatus according to claim 16, wherein said light-emitting device group further includes four light-emitting diode chips disposed from said central point at an equal distance.

* * * * *